United States Patent
Goto et al.

(10) Patent No.: US 8,556,510 B2
(45) Date of Patent: Oct. 15, 2013

(54) ROTATING APPARATUS CAPABLE OF IMPROVING THE ROTATION RELIABILITY EVEN AFTER HAVING BEEN DOWNSIZED, AND METHOD FOR MANUFACTURING THE ROTATING APPARATUS

(75) Inventors: Hiromitsu Goto, Shizuoka (JP); Ryusuke Sugiki, Shizuoka (JP); Akira Aoi, Shizuoka (JP)

(73) Assignee: Samsung Electro-Mechanics Japan Advanced Technology Co., Ltd., Shizuoka (JP)

( * ) Notice: Subject to any disclaimer, the term of this patent is extended or adjusted under 35 U.S.C. 154(b) by 110 days.

(21) Appl. No.: 13/269,447

(22) Filed: Oct. 7, 2011

(65) Prior Publication Data

US 2012/0093446 A1   Apr. 19, 2012

(30) Foreign Application Priority Data

Oct. 19, 2010   (JP) .................................. 2010-234706

(51) Int. Cl.
*F16C 32/06*   (2006.01)

(52) U.S. Cl.
USPC .......................................... 384/100; 384/107

(58) Field of Classification Search
USPC ........... 384/100, 107–120; 310/90; 29/898.02
See application file for complete search history.

(56) References Cited

U.S. PATENT DOCUMENTS

| | | | |
|---|---|---|---|
| 8,315,011 B2 * | 11/2012 | Nishitani | 360/99.08 |
| 2003/0190100 A1 * | 10/2003 | Grantz et al. | 384/119 |
| 2006/0126979 A1 * | 6/2006 | Uenosono et al. | 384/100 |
| 2007/0058291 A1 * | 3/2007 | Shirai et al. | 360/99.08 |
| 2007/0133911 A1 * | 6/2007 | Nishimoto et al. | 384/100 |
| 2009/0168246 A1 * | 7/2009 | Kainoh et al. | 360/224 |
| 2011/0033144 A1 * | 2/2011 | Kodama | 384/112 |

FOREIGN PATENT DOCUMENTS

JP   2003289646   10/2003

* cited by examiner

*Primary Examiner* — Phillip A Johnson
(74) *Attorney, Agent, or Firm* — Fulwider Patton LLP

(57) ABSTRACT

A disk drive device includes a base plate, a hub, and a bearing unit. The bearing unit includes an outer sleeve, an inner sleeve, a shaft, a radial dynamic pressure groove, and a lubricant agent. In the joined portion of the outer sleeve and the hub, there are formed a recessed portion, which is a binding region, where the outer sleeve and the hub are joined together with a hardening resin present between the outer sleeve and the hub and a tilt preventing portion, provided on both the sides of the recessed portion in the axial direction of the outer, which is a raised region that forms a portion narrower than a gap, between the outer sleeve and the hub, corresponding to the recessed portion.

20 Claims, 10 Drawing Sheets

ROTATING APPARATUS CAPABLE OF IMPROVING THE ROTATION RELIABILITY EVEN AFTER HAVING BEEN DOWNSIZED, AND METHOD FOR MANUFACTURING THE ROTATING APPARATUS

CROSS-REFERENCE TO RELATED APPLICATIONS

This application claims priority from Japanese Application No. 2010-234706, filed Oct. 19, 2010.

BACKGROUND OF THE INVENTION

1. Field of the Invention

The present invention relates to a rotating apparatus and a method for manufacturing the rotating apparatus and, more particularly, to a technology for improving the rotation reliability even after the rotating apparatus has been downsized.

2. Description of the Related Art

The demand for rotating apparatuses represented by hard disk drives (hereinafter referred to as "disk drive device", or "HDD" also) today is to meet the double requirement for further downsizing and reliability of withstanding long-term usage.

Many of the disk drive devices are equipped with a hub on which recording disks are placed. The hub is supported by a base plate via a bearing unit. The bearing unit includes a shaft and a shaft housing member that houses the shaft, and there is formed a radial dynamic pressure groove on at least one of an outer circumferential surface of the shaft and an inner circumferential surface of the shaft housing member. The bearing unit functions as the bearing in such a manner that the dynamic pressure is produced through a lubricant agent present in a formation space of the radial dynamic pressure grooves. The hub is joined to the outer periphery of the bearing unit. Such a disk drive device as described above is disclosed in Japanese Unexamined Patent Application Publication No. 2003-289646, for instance.

To satisfactorily achieve the write and read of data in the disk drive device, it is required that the recording disk be stably rotated relative to a read/write head at high speed. For that purpose, the hub needs to joined at a substantially right angle to the bearing unit while a sufficiently robust binding strength is maintained against the bearing unit.

A method in which the hub is bonded to the outer periphery of the shaft housing member is conceivable as a way for connecting the hub to the bearing unit. When a desirable junction strength is to be ensured using this method, the following specific method is generally employed. That is, a relatively large gap is formed between the hub and the shaft housing member and then a large amount of hardening agent (bonding adhesive) is present in the gap. However, there are cases where the hardening resin present in the gap contracts unevenly in the axial or circumferential direction when the hardening agent hardens. As the hardening agent unevenly hardens in the circumferential direction, the hub tends to be decentered relative to the bearing unit. Also, as the hardening agent unevenly contracts in the axial direction, the hub is more likely to incline relative the bearing unit.

A method in which the hub is simply press-fit to the outer periphery of the shaft housing member is conceivable as another way for connecting the hub to the bearing unit. To ensure the junction strength by the press-fitting only, the so-called press-fitting margin is generally set in the vicinity of 10 μm. However, as the hub is press-fit to the outer periphery of the shaft housing member, the inner circumferential surface of the shaft housing member may contract and get deformed inward. In particular, when the disk drive device is reduced in size, a cylindrical wall portion of the shaft housing member tends to become thinner on account the downsizing and therefore the deformation of the inner circumferential surface of the shaft housing member becomes large. Forming the radial dynamic pressure groove on the inner circumferential surface of the shaft housing member causes the deformation of the circumferential surface of the shaft housing member, which results in the deformation of the radial dynamic pressure groove. That is, an increase in the deformation of the inner circumferential surface of the shaft housing member results in an increase in the deformation of radial dynamic pressure groove. As the deformation of the radial dynamic pressure groove grows larger, the distribution balance of radial dynamic pressure is disrupted and a flow of the lubricant agent is more likely to occur. This causes the operating life of the bearing unit to be shortened considerably. Even in a case where the radial dynamic pressure groove is formed on the outer circumferential surface of the shaft, a distance up to the radial dynamic groove in opposition to the shaft housing member varies due to the deformation in the inner circumferential surface of the shaft housing member. Hence, the distribution balance of radial dynamic pressure is disrupted similarly and the similar failures to the above occur.

SUMMARY OF THE INVENTION

The present invention has been made in view of the foregoing circumstances, and a purpose thereof is to provide a rotating apparatus capable of maintaining or improving the reliability even when it is downsized.

To resolve the foregoing problems, a rotating apparatus according to one embodiment of the present invention includes: a base plate; a hub having an opening in a center wherein a recording disk is to be placed on an outer circumference of the hub; and a bearing unit configured to rotatably support the hub relative to the base plate. The bearing unit includes: an outer sleeve joined to an inner circumference of the opening; an inner sleeve joined to an inner circumference of the outer sleeve; a shaft housed in the inner sleeve wherein one end of the shaft is jointed to the base plate; a radial dynamic pressure groove provided on at least one of an inner circumferential surface of the inner sleeve and an outer circumferential surface of the shaft; and a lubricant agent present in between the inner circumferential surface of the inner sleeve and the outer circumferential surface of the shaft. In a joined portion of the outer sleeve and the hub, there are formed (1) a binding region where the outer sleeve and the hub are joined together with a hardening resin present therebetween and (2) a raised region, provided on both sides of the binding region in an axial direction of the outer sleeve, which forms a portion narrower than a gap, between the outer sleeve and the hub, corresponding to the binding region.

By employing this embodiment, the outer sleeve and the hub are joined together by the bonding. Thus the binding strength gained by the binding region can be secured and the inclination of the joined portion due to the raised region can be suppressed while the deformation of the outer sleeve is suppressed and the disruption of the generation balance of dynamic pressure in the radial dynamic pressure grooves is prevented. It is to appreciated here that the "rotating apparatus" may be a device a device to drive the recording disks, and it may be a hard disk drive, for instance.

Another embodiment of the present invention relates to a method for manufacturing a rotating apparatus. The method is a method for manufacturing the above-described rotating apparatus and it includes: assembling the bearing unit including the shaft, the shaft having a smaller diameter section housed in the inner sleeve and a larger diameter section which is larger in diameter than the smaller diameter section; assembling a subassembly by jointing the hub to the bearing unit; placing the subassembly in such a manner that a disk placement section included in the subassembly touches a cradle provided on a base of an aligning block; applying a hardening resin to a bearing hole of the base plate, the base plate having the bearing hole in which the larger diameter section is housed in a loosely fit state; moving the base plate in such a manner that a center of the bearing hole and a center of the larger diameter section agree with each other, and fitting the bearing hole to the larger diameter section such that a part of the hardening resin spills out along an outer edge of the bearing hole; having the hardening resin evenly penetrate a gap between the bearing hole and the larger diameter section before the hardening resin hardens; temporarily hardening the part of the hardening resin spilt out along the outer edge of the bearing hole with the base plate and the subassembly placed on the aligning block; and hardening the base plate and the subassembly after the hardening resin has temporarily hardens.

By employing this embodiment, the larger diameter section is used as a portion to be inserted to the bearing hole of the base plate and therefore the junction area ensured can be made larger. Thus, the joint strength by the hardening resin can be raised. The hardening resin is temporarily hardened first and then the base plate and the subassembly are finally and completely hardened after the hardening resin has temporarily hardened. Thus, the hardening is performed in stages and thereby the effect of suppressing the inclination due to the contraction by the hardening the hardening resin is improved. Also, the joining angle of the base plate and the subassembly (e.g., adjusting it to a right angle) is achieved, so that the assembly accuracy can be improved.

Optional combinations of the aforementioned constituting elements, and implementations of the invention in the form of methods, apparatuses, systems, and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

Figure 1:
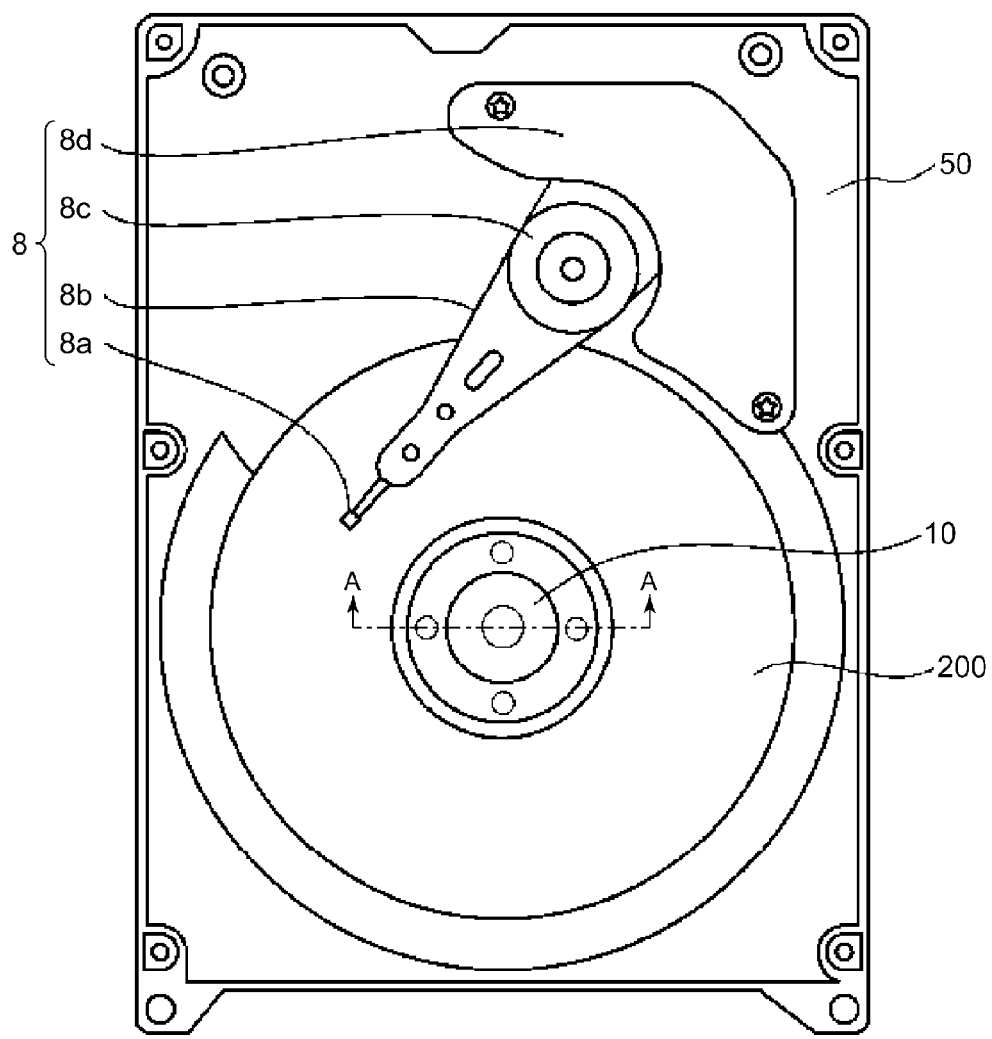
FIG. 1 is a diagram used to describe an internal structure of a disk drive device (HDD), which is an example of rotating apparatus, according to an embodiment of the present invention.

The invention will now be described by reference to the preferred embodiments. This does not intend to limit the scope of the present invention, but to exemplify the invention.

Hereinafter, the present invention will be described based on preferred embodiments with reference to the accompanying drawings. The same or equivalent constituents or members illustrated in each drawing will be denoted with the same reference numerals, and the repeated description thereof will be omitted as appropriate. The size of components in each Figure may be changed as appropriate in order to aid understanding. Some of the components and members in each Figure may be omitted if they are not important in the course of explanation.

FIG. 1 is a diagram used to describe an internal structure of a disk drive device 100, which is an example of rotating apparatus, according to an embodiment of the present invention. To show the internal structure thereof, a top cover is removed in FIG. 1.

The disk drive device 100 includes a base plate 50, a hub 10, a recording disk 200 of magnetic recording type, a data read/write unit 8, and a top cover (not shown). In the following description, a top side (front side of FIG. 1 facing a viewer) where the hub 10 is mounted relative to the base plate 50 is defined as "upside" whereas a longitudinal direction of the base plate 50 is "lateral direction".

The recording disk 200, which is placed and held on the hub 10, rotates together with the rotary drive of the hub 10. The base plate 50 is formed such that an aluminum alloy is molded using a die-cast. The base plate 50 rotatably supports the hub 10 via a bearing unit described later. The data read/write unit 8 includes a read/write head 8a, a swing arm 8b, a pivot assembly 8c, a voice coil motor 8d. The read/write head 8a, mounted on a tip of the swing arm 8b, records data magnetically to and reads data from the recording disk 200. The pivot assembly 8c, which rotates about a head rotating shaft, swingably supports the swing arm 8b relative to the base plate 50. The voice coil motor 8d causes the swing arm 8b to swing about the head rotating shaft and thereby moves the read/write head 8a to a predetermined position on the recording surface of the recording disk 200. The data read/write unit 8 may be configured by the use of any known technique for controlling the position of the head.

Figure 2:
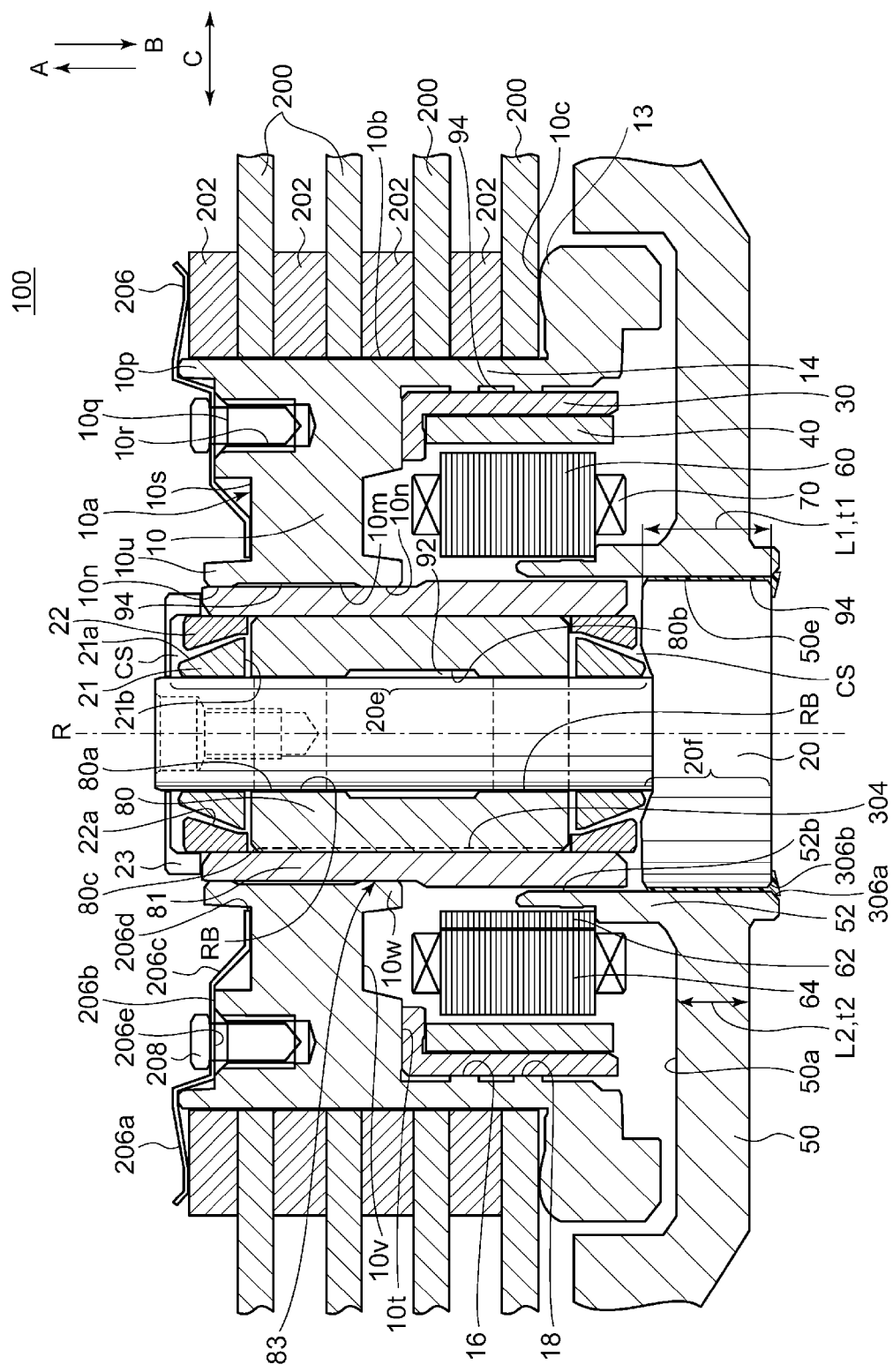
FIG. 2 is a diagram for explaining a portion used to rotate and drive recording disks of a disk drive device of FIG. 1.

FIG. 2 is cross-sectional view taken along the line A-A of FIG. 1. The disk drive device 100 mounts a plurality of recording disks 200 of 3.5 inch type and 95 mm in diameter, for instance, and rotates the plurality of recording disks 200. For example, the diameter of a central hole of each recording disk 200 is 25 mm, and the thickness of each recording disk 200 is 1.27 mm. In the following description, direction A indicated in FIG. 2 may sometimes be called "upside" or "upper direction". Also, direction B indicated in FIG. 2 may sometimes be called "downside" or "downward direction". Also, the direction A and direction B may sometimes be called an axial direction or direction of motor rotating shaft R, and the direction of double-headed arrow C may sometimes be called a radial direction.

The disk drive device 100 includes an approximately cup-like hub 10 having an opening in the center, a base plate 50, a shaft housing member 83, a shaft 20, an inner ring 21, an outer ring 22, a yoke 30, a cylindrical magnet 40, a laminated core 60, a coil 70, a lubricant agent 92 such as oil, a hardening resin 94, a cap member 23.

The shaft housing member 83 includes an inner sleeve 80 having a through-hole 80a and an outer sleeve 81 firmly fixed to an outer circumferential side surface of the inner sleeve 80.

The hub 10 is a component such that the outer appearance of the hub 10 with the motor rotating shaft R as the center is formed in a projected manner. In the present embodiment, consider a case where four recording disks 200 are placed and held on the hub 10. The central holes of four recording disks 200 are fit to the surface of a cylindrical outer cylinder part 10b which is a part protruding upward in the hub 10 of FIG. 2. The recording disk 200 placed on the bottom of the four recording disks 200 is seated on a seating surface 10c, having a function to place the disk thereon, which protrudes radially from a lower end of the outer cylinder part 10b in the surface of the hub 10. The diameter of the outer cylinder part 10b is 25 mm, for instance. More precisely, the diameter of the outer cylinder part 10b is within 24.978±0.01 mm. It is to be noted here that the seating surface 10c functions as a disk placement section and the like.

A raised part 13 protruded upward (along arrow A) is formed on the seating surface 10c of the hub 10 so that the recording disk 200 can be seated thereon. The raised part 13 is formed in a ring shape around the motor rotating shaft R, and a surface, of a partial region of the raised part 13, on which the recording disk 200 is seated is a smoothly-curved surface. The cross section of the curved surface is of a circular shape, and the recording disk 200 is in contact with the seating surface 10c circumferentially in line therewith.

Figure 3:
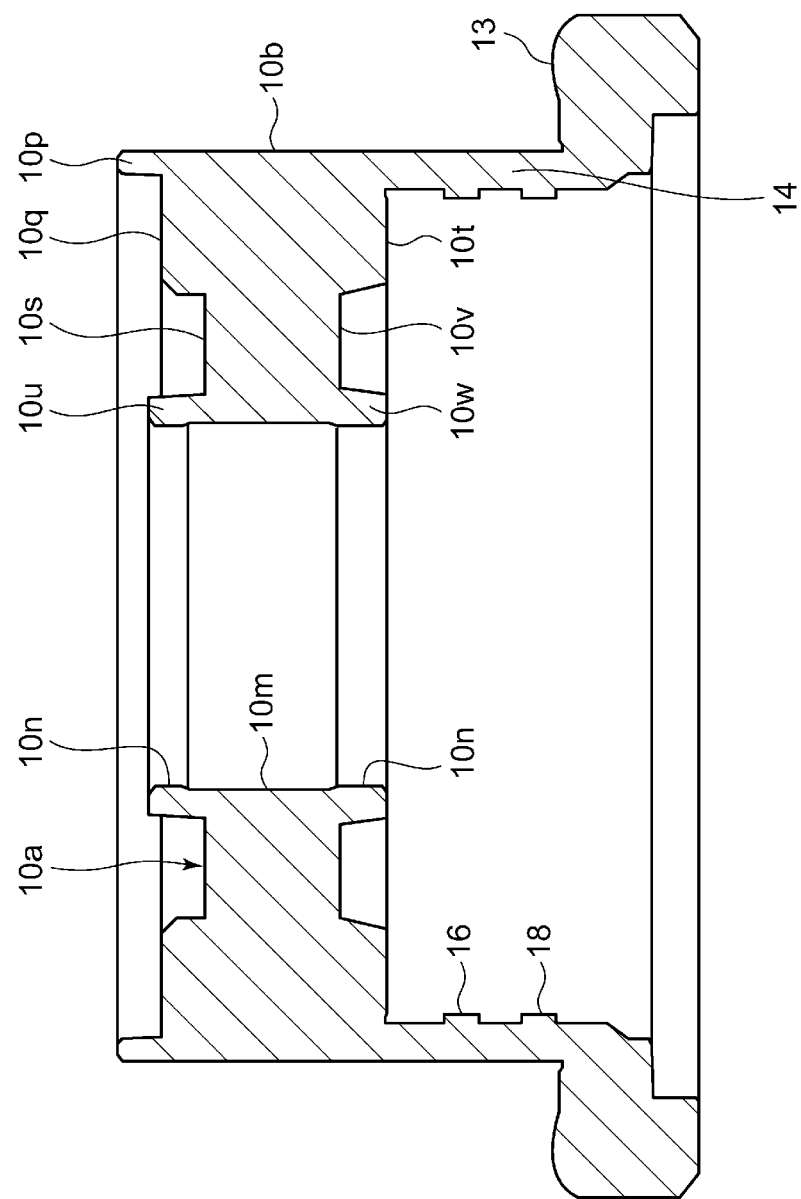
FIG. 3 is a cross-sectional view showing an example of a hub according to an embodiment.

FIG. 3 is a cross-sectional view showing an example of the hub 10 according to the present invention. The hub 10 has a circumferential wall portion 10p, which is a projection of the outer cylinder part 10b in an axially outer direction (arrow A in FIG. 2), on the end face thereof opposite from the base plate 50. Also, the hub 10 has a first circumferential recessed portion 10q, which is recessed in an axial direction (arrow B) from the circumferential wall portion 10p, on the side of the motor rotating shaft R on the radially inner side of the circumferential wall portion 10p. Further, the hub 10 has a second circumferential recessed portion 10s, which is recessed in the axial direction (arrow B) from the first circumferential recessed portion 10q on the radially inner side of the first circumferential recessed portion 10q, and a first circumferential raised portion 10u, which projects in the axially outer direction (arrow A) on the radially inner side of the second circumferential recessed portion 10s. Note that the first circumferential recessed portion 10q is provided with a plurality of screw holes 10r at circumferentially equal intervals, for example, at six positions.

The hub 10 has a cylindrical dividing wall 17 (called a circumferential wall portion also) which extends in an axial direction toward the base plate 50. The dividing wall 14 forms the outer cylinder part 10b on the outside thereof. Also, the hub 10 has a third circumferential recessed portion (outer circumferential recessed portion) 10t, which is recessed in an axial direction from the dividing wall 14 on the radially inner side of the dividing wall 14. Also, the hub 10 has a fourth circumferential recessed portion (inner circumferential recessed portion) 10v, which is recessed in the axial direction from the third circumferential recessed portion 10t on the radially inner side of the third circumferential recessed portion 10t, and a second circumferential raised portion (circumferential raised portion) 10w, which projects in the axially downward direction from the fourth circumferential recessed portion 10v on the radially inner side of the fourth circumferential recessed portion 10v. The fourth circumferential recessed portion 10v is formed on the radially inner side of the first circumferential recessed portion 10q and in a position radially overlapping the second circumferential recessed portion 10s.

A clamper 206 is an approximately disk-shaped member which comprises an outer edge portion 206a, a middle portion 206b, and an inner edge portion 206c, and which has a center hole 206d, and holes 206e. The outer edge portion 206a holds down the recording disks 200 from above. On the inner side of the outer edge portion 206a extends the middle portion 206b, and on the inner side of the middle portion 206b extends the inner edge portion 206c. Formed on the inside of the inner edge portion 206c is the center hole 206d. The clamper 206 has the holes 206e in the middle portion 206b thereof in positions corresponding to the screw holes 10r. The clamper 206 is fit on with the inner edge portion 206c set in the second circumferential recessed portion 10s and the middle portion 206b set on the inside of the circumferential wall portion 10p and touching the first circumferential recessed portion 10q. In this configuration, the clamper 206 is positioned in accordance with the upper end profile (raised and recessed portions) of the hub 10. This makes it easier to fit the clamper 206 on and allows for automation of assembly. Also, the profile of the top face 10a of the hub 10 with raised and recessed portions can create a form of the clamper 206 fit along the profile with a plurality of bends. As a result, both the resiliency and rigidity of the clamper 206 can be improved. The improved resiliency of the clamper 206 increases and stabilizes the pressure on the recording disks 200, which will ensure a stable fixation of the recording disks 200.

On the other hand, ring-shaped spacers 202 are inserted axially in between the four recording disks 200. The clamper 206 pushes, by the outer edge portion 206a thereof, the four recording disks 200 and three spacers 202 against the raised part 13 on the hub 10 through the medium of a spacer 202. The clamper 206 is secured with a plurality of clamp screws 208 which are driven through the holes 206e into the screw holes 10r in the top face 10a of the hub 10. A yoke 30 is held on the inside of the dividing wall 14 of the hub 10. That is, the dividing wall 14 is held between the yoke 30 and the spacers 202 and recording disks 200.

The yoke 30, which has an L-shaped cross section, is made of a magnetic material such as iron. The yoke 30 is both press-fit and adhesively bonded to the inner circumferential surface of the dividing wall 14. Formed on the inner circumferential surface of the dividing wall 14 are a first raised portion 16 and a second raised portion 18 against which the yoke 30 is press-fit. The first raised portion 16 and the second raised portion 18 are both a ring-shaped raised portion formed around the motor rotating shaft R, and they are located axially apart from each other, with the first raised portion 16 above the second raised portion 18. A hardening resin 94 is filled between the inner circumferential surface of the dividing wall 14 and the outer circumferential surface of the yoke 30. It is to be noted that the hardening resin 94 applied in a proper amount on the inner circumferential surface of the dividing wall 14 beforehand will ensure a uniform application thereof by the press-fitting of the yoke 30 into the hub 10.

The cylindrical magnet 40 is bonded to the inner circumferential surface of the yoke 30. The cylindrical magnet 40, which is formed of a rare-earth material such as neodymium, iron or boron, is radially opposed to nine salient poles of the laminated core 60. It can be understood that the cylindrical magnet 40 is magnetized to drive eight poles circumferentially. The cylindrical magnet 40 is fixed to the hub 10 via the yoke 30.

The hub 10 has a center hole for receiving the shaft housing member 83 thereby constituting a bearing unit. And the center hole is formed such that the hub 10 has a recessed portion 10*m*, which is recessed radially outward, in the inner cylinder surface thereof and a tilt preventing portion 10*n* axially on each side of the recessed portion 10*m*. The recessed portion 10*m* corresponds to the bonding region for providing a binding force by the inclusion of the hardening resin 94 when the recessed portion 10*m* is fit against an outer sleeve 81. The tilt preventing portions 10*n* correspond to the tilt preventing region for preventing the tilt of the outer sleeve 81 relative to the hub 10 when the hardening resin 94 hardens. The inner circumferential surfaces of the first circumferential raised portion 10*u* and the second circumferential raised portion 10*w* of the hub 10 constitute the tilt preventing portions 10*n* which are raised regions, and it is so designed that the axial lengths of the respective tilt preventing portions 10*n* are shorter than the axial lengths of the first circumferential raised portion 10*u* and the second circumferential raised portion 10*w* which constitute them. In other words, the axial length of the tilt preventing portions 10*n* is less than or equal to the axial length of the first circumferential raised portion 10*u*, for instance. It goes without saying that the axial length of the tilt preventing portion 10*n* may be identical to the axial length of the first circumferential raised portion 10*u* or the second circumferential raised portion 10*w*. Where the shaft housing member 83 is press-fit to the center hole (middle portion) of the hub, a deformation of the shaft housing member 83 may cause degradation in the shaft supporting accuracy of the shaft, which is not desirable. Thus, by setting the axial length of the tilt preventing portions 10*n* as done in the present embodiment, the stress at the time the shaft housing member 83 is press-fit thereto can be absorbed by a deformation toward the outer circumferential direction of the first circumferential raised portion 10*u* and the second circumferential raised portion 10*w*. That is, the axial length of the tilt preventing portion 10*n* is set to the axial length of the first circumferential raised portion 10*u* or below, for instance; thereby, the effective range of the stress resulting from the press-fitting of the shaft housing member 85 to the center hole of the hub can be limited to the first circumferential raised portion 10*u* only. Hence, the deformation of the shaft housing member 83 and the main body of the hub 10 can be suppressed. The recessed portion 10*m* is 40 to 120 μm larger in diameter than the portion corresponding to the bonding region of the outer sleeve 81, and this area keeps the hardening resin 94 so that the bond force is improved by retaining a predetermined thickness of a bonding layer. Also, the bond force is kept constant by retaining the predetermined thickness of the bonding layer. On the other hand, the tilt preventing portions 10*n* are formed such that the diameter thereof is smaller than that of the recessed portion 10*m*. The diameters of the recessed portion 10*m* and the tilt preventing portions 10*n* can be determined experimentally or in a similar manner in advance in consideration of such factors as the joint strength of the hub 10, the possibility of tilting, and the ease of assembly operation.

Also, as described above, the gap between the tilt preventing portions 10*n* and the outer sleeve 81 is narrower than the gap between the recessed portion 10*m* and the outer sleeve 81. Therefore, when the shaft housing member 83, which includes the outer sleeve 81, is inserted in the center hole of the hub 10, the shaft housing member 83 can be supported by the hub 10 at two, upper and lower, positions with a narrow gap therebetween. This will not only make it easier to ensure perpendicularity between the hub 10 and the shaft housing member 83 when they are connected to each other, but also reduce the variation in tilting among individual product units. It is to be noted that the tilt angle at joining of the parts (the hub 10 and the shaft housing member 83) can be reduced if the first raised portion 16 and the second raised portion 18 are formed as wide apart from each other as possible in the axial direction. Also note that the tilt angle at joining of the parts can be reduced if the two tilt preventing portions 10*n* are formed as wide apart from each other as possible in the axial direction. And the positions of the two tilt preventing portions 10*n* can be determined according to the amount of the hardening resin 94 to be retained in the recessed portion 10*m*. Also, the arrangement may be such that one or more raised portions are provided in addition to the two tilt preventing portions 10*n*. The additional presence of such raised portions will improve the perpendicularity between the hub 10 and the shaft housing member 83 when they are connected to each other, but may decrease the region of the recessed portion 10*m*. Therefore, it is desirable that the positions of the two tilt preventing portions 10*n* and the number of such raised portions to be formed be determined by checking the balance between the bond force and the perpendicularity experimentally or in a similar manner.

The bearing unit includes an inner sleeve 80, an outer sleeve 81, a shaft 20, radial dynamic pressure grooves RB, a lubricant agent 92, an inner ring 21, and an outer ring 22. The outer sleeve 81 is joined, on one end side thereof, to the inner circumference of the hub 10. The shaft 20 is joined, on the other end side thereof, to the base plate 50.

The inner sleeve 80 is joined to the inner circumferential surface of the outer sleeve 81. For example, the outer circumferential surface of the inner sleeve 80 is formed about 2 to 15 μm larger in diameter than the inner circumferential surface of the outer sleeve 81. Thus, the inner sleeve 80 is joined to the inner circumferential surface of the outer sleeve 81 in an interference fit. The double structure of the inner sleeve 80 and the outer sleeve 81 works to reduce effects on the inner circumferential surface of the inner sleeve 80 even when the outer circumferential surface of the outer sleeve 81 is subjected to stress. In other words, the variation in the gap between the inner circumferential surface of the inner sleeve 80 and the outer circumferential surface of the shaft 20 can be suppressed, so that stable dynamic pressure can be generated. Accordingly, the loss of rotational stability, which includes uneven rotation, can be prevented.

The inner sleeve 80 has a through-hole 80a in the center thereof. The through-hole 80a is provided with a lubricant reservoir 80b which is recessed radially outward in the axially middle part thereof. A part of the shaft 20 is placed in the through-hole of the inner sleeve 80. Provided on at least one of the inner circumferential surface of the through-hole 80a of the inner sleeve 80 and the outer circumferential surface of the shaft 20 is a set of herring-bone shaped radial dynamic pressure grooves RB set apart from each other in the axial direction. The radial dynamic pressure grooves RB are provided in positions axially away from the lubricant reservoir 80b. The formation of the lubricant reservoir 80b achieves stable generation of dynamic pressure by retaining the lubricant agent 92 between the inner sleeve 80 and the shaft 20. Also, the formation of the radial dynamic pressure grooves RB with the lubricant reservoir 80b in between allows generation of dynamic pressure on the shaft at two, upper and lower, positions. As a result, the inner sleeve 80, in relation to the shaft 20, can be supported by dynamic pressure at two positions, which will contribute to the stability of rotation.

Capillary seals CS, each of which is structured by an inner ring 21 and an outer ring 22, are disposed axially on both ends of the inner sleeve 80. The inner periphery of the inner ring 21 is joined to the outer circumferential surface of the shaft 20. Also, the outer periphery of the inner ring 21 has a first tapered portion 21a which contracts in diameter axially away from the end of the inner sleeve 80. The outer ring 22 is joined to a hub side such that the outer ring 22 rotates in one with the hub 10. For example, the outer ring 22 is connected to part of the outer sleeve 81. And the inner periphery of the outer ring 22 has a second tapered portion 22a which contracts in diameter axially away from the end of the inner sleeve 80 in opposition to the first tapered portion 21a. The gap created by the opposing first tapered portion 21a and second tapered portion 22a constitutes a capillary seal CS which is wider axially away from the end of the inner sleeve 80. The capillary seal CS is so formed that the gap therein is wider in the axially outward direction. The lubricant agent 92 is continuously present in the gap between the through-hole 80a and the shaft 20, at the axial ends of the inner sleeve 80, and halfway into the capillary seal CS. Each of the capillary seals CS, with its capillary action, prevents the leaking-out of the lubricant agent 92.

Figure 4:
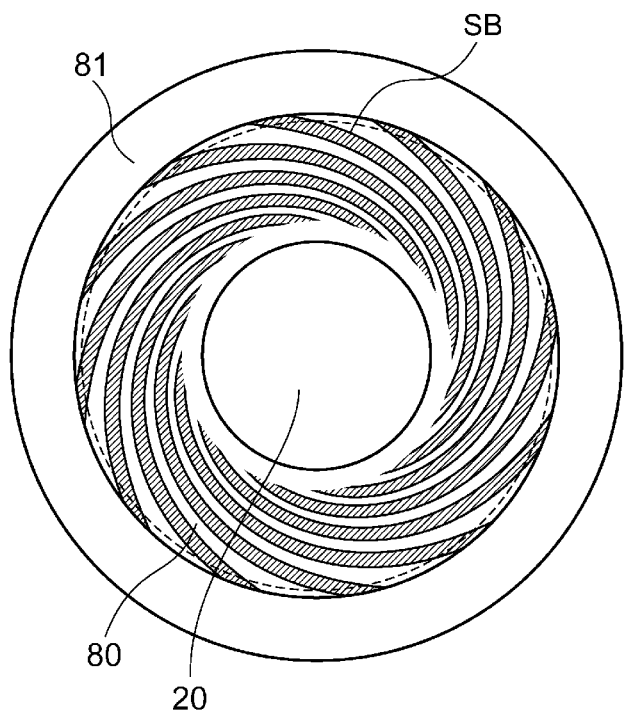
FIG. 4 is a top view of a shaft housing member of a disk drive device according to an embodiment.

The inner ring 21 is disposed such that an inner ring end face 21b, which is an axial end face opposite to the inner sleeve 80, faces the axial end face of the inner sleeve 80 with a gap in between. The outer ring 22 is disposed such that an outer ring end face, which is an axial end face opposite to the inner sleeve 80, is in contact with the axial end face of the inner sleeve 80 while the outer ring 22 is joined to the inner circumferential surface of the outer sleeve 81. FIG. 4 is an illustration showing an example of thrust dynamic grooves SB formed in the top surface of the inner sleeve 80 fit in the outer sleeve 81. The inner sleeve 80 is so formed that at least the region facing the inner ring end face 21b and the region in contact with the outer ring end face, of the axial end face thereof, are flat. Provided on at least one of the inner ring end face 21b and the axial end face of the inner sleeve 80 are herring-bone shaped or spiral shaped thrust dynamic pressure grooves SB. There is a presence of the lubricant agent 92 between the thrust dynamic pressure grooves SB and the surface opposite thereto. The inner sleeve 80 may have the thrust dynamic grooves SB, for instance, astride the region facing the inner ring end face 21b and the region facing the outer ring 22. At least the region facing the inner ring end face 21b and the region in contact with the outer ring end face, of the axial end face of the inner sleeve 80, are formed flat, and therefore it is possible to easily form the thrust dynamic grooves SB astride the region facing the inner ring 21 and the region facing the outer ring 22. Further, a chamfer 80c may be provided along the outer peripheral edge of the end face of the inner sleeve 80. The thrust dynamic grooves SB in the region facing the outer ring 22 and the chamfer 80c along the outer peripheral edge of the end face of the inner sleeve 80 can constitute part of a communicating path for feeding the lubricant agent 92 into the thrust dynamic grooves SB in the region facing the inner ring 21 which can produce the most effective thrust dynamic pressure. As will be discussed later, the communicating path communicates with each other the capillary seals CS provided above and below the inner sleeve 80. This communication path can be formed easily since at least the region facing the inner ring end face 21b and the region in contact with the outer ring end face, of the axial end face of the inner sleeve 80, are formed flat.

The bearing unit that rotatably supports the hub 10 is structured by the shaft 20, the lubricant agent 92, the inner sleeve 80, the outer sleeve 81, the inner ring 21, and the outer ring 22. In the disk drive device 100 with the shaft 20 rotating, the hub 10, the inner sleeve 80, the outer sleeve 81 and the outer ring 22 are radially and axially supported by the dynamic pressure generated through the aforementioned radial dynamic pressure grooves RB and the thrust dynamic grooves SB in the lubricant agent 92 in substantially noncontact condition.

The laminated core 60 has a core circular part 62 and nine salient poles extending from the core circular part 62 in a radially outward direction. The laminated core 60 is formed such that eight non-oriented electromagnetic steel sheets each having the thickness of 0.35 mm, for instance, are stacked together and integrally formed into a single unit by caulking. In a method for manufacturing the laminated core 60, an electromagnetic steel sheet which has been subjected to the insulation processing on the surface is first press-formed and stamped out into a desired shape by half-punching the sheets, thereby forming the respective electromagnetic steel sheets. Then the press-formed eight electromagnetic steel sheets are integrally formed into the single unit in such a manner that the core-shaped eight electromagnetic steel sheets are swaged by an internal die caulking that uses a half punching process. After formed integrally, the laminated core 60 undergoes the surface processing to prevent an insulating layer on the surface of the laminated core from being separated or the like. Various methods may be used for this surface processing. For example, a method for adhering an epoxy resin using the spray coating or cationic electrodeposition may be advantageous in that a uniformly coated film can be formed.

The shaft 20 is a cylindrically-shaped member formed of a stainless steel, for instance, and the shaft 20 has a smaller diameter section 20e which is housed in the through-hole 80a of the inner sleeve 80 and a larger diameter section 20f whose outer diameter is larger than that of the smaller diameter section 20e and wherein the larger diameter section 20f projects from the inner sleeve 80. Note that the larger diameter section 20f of the shaft 20 may be structured separately from the smaller diameter section 20e thereof. For example, a body side of the shaft 20, which includes the smaller diameter section 20e, is a member constituting a main component of the bearing unit. Thus, the body side thereof is processed with a high degree of accuracy, using a hard metal such as SUS 420. On the other hand, for a circular-ring shaped larger diameter section 20f which is formed separately, it is desirable that the larger diameter section 20f be formed of a comparatively soft material such as brass, aluminum and SUS 430 in consideration of manufacturability. In other words, the larger diameter section 20f is preferably formed of a material softer than the material that forms the smaller diameter section 20e. It is to be noted here the larger diameter section 20f may be sometimes called "bush". A circular-ring-like bush is fixed to the shaft 20 in an interference fit. A description is given hereunder of an example where the smaller diameter section 20e and the larger diameter section 20f are integrally formed with each other as the shaft 20 as shown in FIG. 2.

A base circular part 52 with the motor rotating shaft R as the center is provided on a top face 50a of the base plate 50. The base circular part 52 forms a bearing hole 50e in the inner side surface thereof. The base circular part 52 partially projects upward from the base plate 50. An inner side surface of the core circular part 62 of the laminated core 60 is fixed to an outer side surface of the base circular part 52 in an interference fit or adhesive bonding. At the same time, the larger diameter section 20f of the shaft 20 is fixed to the inner side surface of the base circular section 52 by the hardening resin 94.

If the diameter of the larger diameter section 20f of the shaft 20 is small, the outer circumferential area of the larger diameter section 20f will be small. As a result, the junction area (bonding area) between the larger diameter section 20f and the base circular part 52 becomes small and therefore it is difficult to obtain a desirable shock resistance strength. Conversely, if the diameter of the larger diameter section 20f of the shaft 20 is large, the outer circumferential area of the larger diameter section 20f will be large. As a result, a large quantity of hardening resin must be present in the junction between the large diameter section 20f and the base circular part 52. When a large quantity of hardening resin is present, there is an increased amount of volatile component that scatters before and after the hardening and therefore the recording disks 200 may be contaminated. In the light of this, the inventors of the present invention had come to conclusion as follows through various experiments. That is, when the diameter of the larger diameter section 20f of the shaft 20 is larger than that of the smaller diameter section 20e by a factor of 2 to 5, the problem concerning the aforementioned shock resistance strength and the problem caused by the hardening resin can be resolved in a well-balanced manner. For example, in the present embodiment in conjunction with FIG. 2, the diameter of the smaller diameter section 20e is 3.054 mm and the diameter of the larger diameter section 20f is 10.714 mm which is 3.5 times the diameter of the smaller diameter section 20e. As a result, the joint strength improves, so that the required level of shock resistance strength can be ensured. At the same time, it has been verified that the effect of the scattering volatile component poses no practical problem. Also, formation of both the smaller diameter section 20e and the larger diameter section 20f makes it easy to axially shift the joint area that determines the shock resistance strength from an area where a coil 70 is wound. This prevents the winding space of the coil 70 from being reduced and therefore a problem of increased drive current and so forth can be eliminated.

Also, in the embodiment in conjunction with FIG. 2, the larger diameter section 20f is formed such that the diameter of the larger diameter section 20f is larger than the diameter of the outer circumferential side surface of the shaft housing member 83, namely the diameter of the outer sleeve 81. In FIG. 2, the outer sleeve 81, which is one of rotating members, rotates relative to the base circular part 52, which is one of fixed members. Hence, a gap needs to be provided between the base circular part 52 and the outer sleeve 81. In this case, forming the larger diameter section 20f such that the diameter thereof is larger than the outer sleeve 81 enables forming the gap for the rotation without a level difference, namely even by forming it in an axially straight manner. Thus, the base plate 50 can be processed with ease.

There are cases where the inner side surface of the base circular part 52 is deformed inwardly when the laminated core 60 is fixed to the base circular part 52. If the large diameter section 20f is to be bonded to such a deformed inner side surface thereof, the shaft 20 may be fixed with the shaft 20 being tilted. Accordingly, in the present embodiment, the larger diameter section 20f is fixed to the inner circumferential surface of the base circular part 52 in a position that does not overlap axially the laminated core 60. Fixing the larger diameter section 20f in a position that avoids axially overlapping with the laminated core 60 eliminates the factor that may contribute to the tilting and thereby reduces the tilting.

Also, the base circular part 52 surrounds circularly at least part of the shaft housing member 83 and constitutes a narrow gap 52b extending axially between the inner circumferential surface of the base circular part 52 and the outer circumferential surface of the shaft housing member 83. For example, the base circular part 52 has a shape such that the side surface of the base circular part 52 surrounds circularly the outer sleeve 81 and overlaps axially to form the narrow gap 52b. The narrow gap 52b limits the circulation of air in the capillary seal CS positioned on a base plate 50 side so as to keep the pressure of vapor of the lubricant agent 92, which is close to the air-liquid interface, in a state close to a saturated vapor pressure. As a result, additional evaporation of the lubricant agent 92 can be suppressed. The outer sleeve 81 is arranged so that the lower end of the outer sleeve 81 is located closer to the base plate 50 side than the lower end of the laminated core 60. This structure can increase the axial length of the narrow gap 52b. Thus, the vaporization of the lubricant agent 92 can be further suppressed.

Also, in the inner circumferential side surface of the base circular part 52, an area opposite to the outer circumferential surface of the outer sleeve 81 is formed such that the diameter of the area opposite thereto is equal to the diameter of an area where the larger diameter section 20f is fixed. This allows the bearing hole 50e to be of a straight form, so that the processing can be done easily and the required number of steps in the manufacturing can be reduced. The base circular part 52 may have a circular groove 50b in the inner circular side surface of the base circular part 52. The groove 50b can give an indication of a position in which the hardening resin 94 is to be applied and, at the same time, can function to maintain the application state of the hardening resin 94 when it was applied.

Also, the outer sleeve 81 may be such that an extreme end side opposite from the base plate 50 forms a smaller diameter section having a diameter smaller than that on the base plate 50 side. Fixing this smaller diameter section to the hub 10 can stabilize the fixing position of the hub 10.

The base plate 50 is formed such that an axial dimension t1 of a contact region L1 which is in contact with the larger diameter section 20f of the shaft 20 in the bearing hole 50e is larger than an axial thickness dimension t2 of a facing region L2 in axial opposition to the coil 70. And the base plate 50 is formed such that a lower end of the contact region L1 projects downward from the facing region L2. Also, the arrangement is such that the axial center of the contact region L1 and the axial center of the facing region L2 practically agree with each other. As a result, the shock load can be transferred in a dispersed manner to the entire region of the larger diameter section 20*f* where the shock load is applied. This prevents the stress from being concentrated on a particular position of the shaft 20 as with a lever and can contribute to reducing the inclination of the shaft 20. In the present embodiment in conjunction with FIG. 2, the axial dimension t1 of the contact region L1 of the bearing hole 50*e* is 3.203 mm, for instance, whereas the axial thickness dimension t2 of the facing region L2 is 2.819 mm, for instance.

The coil 70 is wound around each of the salient poles 64 of the laminated core 60. A three-phase drive current of an approximately sinusoidal waveform flows through the coil 70 so as to generate a drive magnetic flux along the salient pole 64.

An operation of the disk drive device 100 configured as above will now be described. A brushless motor is configured by including the laminated core 60, the coil 70 and the cylindrical magnet 40. The three-phase drive current is supplied to the brushless motor to rotate the hub 10 of the disk drive device 100. With the drive current flowing through the coil 70, the drive magnetic flux is produced along the nine salient poles 64. This drive magnet flux gives the torque on the cylindrical magnet 40 so as to rotate the hub 10.

The radial dynamic pressure grooves RB are formed in the bearing hole 80*a* formed in the inner sleeve 80 using a processing, such as ball rolling and cutting, and an electrochemical technique, such as etching. The inner sleeve 80 is fit to the inner circumference of the outer sleeve 81 in an interference fit, for instance. However, when the inner sleeve 80, after the processing of the radial dynamic pressure grooves RB, is fit to the outer sleeve 81 in an interference fit, the radial dynamic pressure grooves RB may be deformed. If the radial dynamic pressure grooves RB get deformed, the distribution balance of radial dynamic pressure will be disrupted and a flow of the lubricant agent 92 may be caused, thus possibly deteriorating the reliability. Thus, in the present embodiment, the radial dynamic pressure grooves RB in the inner sleeve 80 is formed after the inner sleeve 80 has been fit to the outer sleeve 81. As a result, the deformation of the radial dynamic pressure grooves RB is minimized. If, on the other hand, such deformation is not anticipated, the outer sleeve 81 may be fit after the radial dynamic pressure grooves RB are formed in the inner sleeve 80.

As described above, the hardening resin 94 is used when the hub 10 and the outer sleeve 81 are joined together. Since, in this case, the hardening resin 94 contracts when the hardening resin 94 hardens, a tilt preventing portion 10*n* in the tilt preventing region adds uneven load to the outer sleeve 81. This load may cause a slight deformation in the radial dynamic pressure grooves RB located inside the inner sleeve 80 via the outer sleeve 81. Thus, in the present embodiment, one of tilt preventing regions surrounds circularly the outer ring 22 and at least part thereof is placed in a position axially overlapping the outer ring 22. Also, the tilt preventing portion 10*n* in the other tilt preventing region surrounds circularly the lubricant reservoir 80*b* and at least part thereof is placed in a position axially overlapping the lubricant reservoir 80*b*. As a result, the external force transmitted via the tilt preventing portion 10*n* is prevented from being directly transmitted to a formation region of the radial dynamic pressure grooves RB, which suppresses the deformation of the radial dynamic pressure grooves RB.

Figure 5:
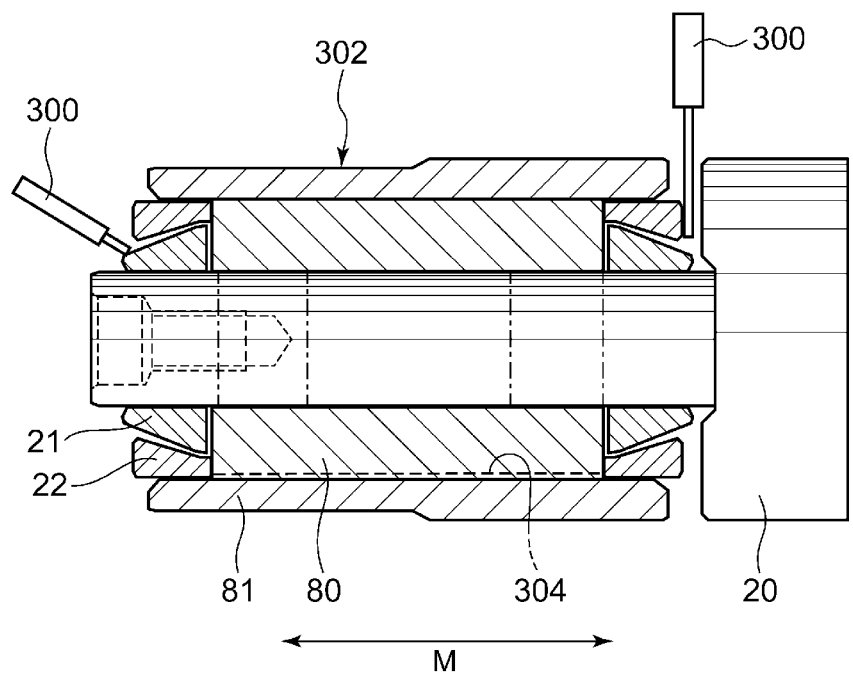
FIG. 5 is a diagram for explaining the injection of a lubricant agent between a shaft housing member and a shaft of a disk drive device according to an embodiment.

A gap between the inner ring 21 and the outer ring 22 constitutes an axial open end. The lubricant agent 92 is discharged from a needle and then injected to a lubricant agent holding region from the open end. As the rotating apparatus is downsized, the diameter of outer periphery of the inner ring 21 becomes smaller, too, and therefore the space where the needle is arranged is subject to a limitation. If, on the other hand, the lubricant agent 92 is discharged while the gap between the needle and the open end is large, the lubricant agent 92 may adhere to portions other than the open end. Accordingly, there is demand that the lubricant agent be discharged with the gap between the needle and the open end being sufficiently small. Thus, according to the present embodiment, as shown in FIG. 5, a needle 300 is placed radially outside and axially outside the bearing unit 302 in order not to interfere with other members, so as to discharge toward the open end from an obliquely outward direction or right angle. Also, the inner ring 21 may be arranged such that an end of the inner ring 21 on a diameter contracting side is projected axially relative to the inner ring 21 from an end of the outer ring 22 on a diameter contracting side. With this arrangement, the needle 300 arranged in a space obliquely outside the open end or the like is positioned sufficiently close to a projection of the inner ring 21 projecting in an axially outward direction from the outer ring 22 so as to discharge the lubricant agent 92. In this case, the lubricant agent 92 is applied to the outer circumferential surface of the inner ring 21 and carried along the outer circumferential surface of the inner ring 21, so that the application of the lubricant agent 92 to portions other than the predetermined ones can be prevented and therefore the lubricant agent 92 can be smoothly injected.

If there is a difference in pressure of the capillary seals CS provided at the both ends of the inner sleeve 80, the lubricant agent 92 will move to a capillary seal CS of a lower pressure and the lubricant agent 92 may leak from one of the capillary seals CS. Thus, besides the through-hole 80*a*, the disk drive device 100 according to the present embodiment is provided with a communicating path 304 for communicating the capillary seals CS with each other. For example, the communicating path 304 is formed in at least one of the outer sleeve 81 and the inner sleeve 80, and communicates the axial end faces of the outer ring 22 placed axially at the both ends of the inner sleeve 80. Also, the communicating path 304 may be formed in either one of the outer sleeve 81 and the inner sleeve 80 in such a manner as to communicate between the axial end faces of the outer ring 22. Note that the communicating path 304 may not be a tubelike passage; instead, grooves may be formed on the surface of either one of the outer sleeve 81 and the inner sleeve 80, and the communicating path 304 may be formed by holding the inner sleeve 80 and the outer sleeve 81 together. The communicating path 304 reduces the pressure difference between the capillary seals CS by the presence of the lubricant agent 92. As a result, the possibility of leakage of the lubricant agent 92 is minimized.

If the lubricant agent 92 of the capillary seal CS located in the upper side of FIG. 2 is left exposed to open air, the lubricant agent 92 will evaporate from the boundary surface between the lubricant agent 92 and air and then diminish. As the lubricant 92 diminishes, the lubrication function drops and eventually reaches the end of its usefulness. As the lubricant agent 92 diminishes fast due to the evaporation thereof, the operating life of the disk drive device 100 becomes shorter and the reliability deteriorates. The disk drive device 100 of FIG. 2 according to the present embodiment is provided with the cap member 23 that covers the air-liquid interface of the capillary seal CS positioned in the upper side. In the example of FIG. 2, the cap member 23 is joined to the outer circumferential surface of the outer ring 22 in such a manner as to over the air-liquid interface of the capillary seal CS. The cap member 23 works to increase the vapor pressure of the lubricant agent 92 in the vicinity of the air-liquid interface of the capillary seal CS, so that additional evaporation can be suppressed.

The cap member 23 can be formed such that various kinds of material such as metal or plastic are used and such a material is formed into the cap member 23 by the use of various methods including cutting work, press work (press forming) and mold-forming. The cap member 23 may be formed by press forming from a stainless steel material such as JIS SUS 303. Use of stainless steel is advantageous in that the accuracy in shape and size is high and the heat resistance is high.

The cap member 23 is formed in the shape of a cup having a through-hole, in the center, through which the shaft 20 penetrates. The cap member 23 is joined to a side surface projecting in an axially outward direction from the outer sleeve 81 and in an axial direction of an end of the outer ring 22, in an interference fit or adhesive bonding. When this cap member 23 formed accordingly is used, the positioning is done easily at the time of assembly. Thus this is advantageous in that the workability is excellent. In another example, the cap member 23 may be joined to the hub 10 and/or clamper 206.

Depending on how the disk drive device 100 is handled, the disk drive device 100 may be subjected to a large impact acceleration. When the disk drive device 100 receives the impact acceleration, the force according to the masses of the recoding disks 200 and the hub 10 is applied to the joined portion of the base plate 50 and the shaft 20. As a result, the binding force of the joined portion drops or is lost and the posture of the shaft 20 cannot be maintained, which may possibly lead to the malfunction of the disk drive device 100. As a result of intensive research, it has been proven that almost no practical problems arises, in the case of the disk drive device 100 as described in conjunction with FIG. 1, as long as the base plate 50 is formed into a shape such that the biding force capable of maintaining a substantial binding state in between the base plate 50 and the shaft 20 is ensured even a test impact acceleration of 400 G is applied to the base circular part 52. The test impact acceleration in this case is called "benchmark test impact acceleration".

In the disk drive device 100 according to the present embodiment described in conjunction with FIG. 2, the shaft 20 has the smaller diameter section 20e and the larger diameter section 20f. Here, the smaller diameter section 20e is housed in the through-hole 80a of the inner sleeve 80, and the outer diameter of the larger diameter section 20f is larger than that of the smaller diameter section 20e. The base plate 50 has the bearing hole 50e whose size is such that a gap is formed with the larger diameter section 20f being fit in the base plate 50. The bearing hole 50e is joined through the presence of the hardening resin 94 in a gap between the bearing hole 50e and the larger diameter section 20f. In this manner, the junction using the larger diameter section 20f is structured, so that the junction area (bonding area) can be made larger. Thus, the bonding force capable of maintaining a substantial bonding state in between the base plate 50 and the shaft 20 is easily ensured even the test impact acceleration of 400 G is applied to the base circular part 52.

In the disk drive device 100 according to the embodiment described in conjunction with FIG. 2, the shaft 20 is formed such that the diameter of the larger diameter section 20f is larger than the outer circumferential surface at an end of the outer sleeve 81 on a base plate 50 side by 0.05 to 0.2 mm. In this case, the inner circumferential surface of the bearing hole 50e can be of a straight form, so that the processing can be done faster as compared with the case where a level difference is made axially. For example, in the embodiment described in conjunction with FIG. 2, the outer diameter of the outer sleeve is 10.601 mm. With this difference in dimensions, the inclination between the shaft 20 and the base plate 50 can be adjusted when the hardening resin 94 is applied or it hardens.

A cleaned air space including the top face 50a which is an upper side of the base plate 50 is defined in the disk derive device 100, and the space is filled with a cleaned gas. If there is a gap between the bearing hole 50e and the joint of the larger diameter section 20f, a foreign material may enter from the exterior and may result in malfunction of the disk drive device 100. Thus, in the disk drive device 100 according to the embodiment described in conjunction with FIG. 2, there are formed an edge portion 306a and an edge portion 306b, each including an inclined surface, at lower ends of the bearing hole 50e and the larger diameter section 20f, respectively. The hardening resin 94 is present across both the edge portion 306a of the bearing hole 50e and the edge portion 306b of the larger diameter section 20f. As a result, the gap between the bearing hole 50e and the joint of the larger diameter section 20f can be made smaller.

Next, a description will be given of an assembly process in the manufacture of a bearing unit 302 of a disk drive device 100 according to the present embodiment. The inner sleeve 80 is fixed in a predetermined position of the outer sleeve 81 in an interference fit, adhesive bonding, or the like. Then, with the inner ring 21 placed on each end face of the inner sleeve 80, the outer ring 22 is fixed in the inner periphery of the outer sleeve 81 in an interference fit, adhesive bonding, or the like. Then the shaft 20 is passed through the bore of the inner ring 21 and the bore of the inner sleeve 80 and fixed in a predetermined position. In this process, the shaft 20 is fixed in the bore of the inner ring 21 in an interference fit, adhesive bonding, or the like. Through processes including the above, the bearing unit 302 before the filling of the lubricant agent 92 is assembled (see FIG. 5).

Next, a description will be given of a method of injecting the lubricant agent 92. The bearing unit 302 before the filling of the lubricant agent 92 is set in a horizontal position (arrow M) as shown in FIG. 5, and air is purged from within a lubricant filling region therein as it is placed in a reduced-pressure atmosphere close to a vacuum. Two needles 300 for discharging the lubricant agent are prepared, and the needles 300 are brought close to the respective ends of the bearing unit 302 (see FIG. 5). The needles 300 are brought closer to the respective portions of the inner rings 21 projecting axially outward from the respective outer rings 22. At this time, the needles 300 may be touching the portions or have a little gap therewith. In this condition, a predetermined amount of the lubricant agent 92 is discharged and adhered in such a manner as to straddle both the inner ring 21 and the outer ring 22. At this point, the lubricant agent 92 will be sucked into the gap between the shaft 20 and the inner sleeve 80 as the pressure around the bearing unit 302 is restored nearly to an atmospheric pressure. This method, which relies on the application of the lubricant agent 92 in such a manner as to straddle the inner ring 21 and the outer ring 22 at both the open ends of the bearing unit 306, is advantageous in that much lubricant agent 92 can be injected in a single step of operation. It is also advantageous in that the process does not easily allow air to be trapped inside. The arrangement may also be such that the amount of the lubricant agent 92 filled is checked by measuring it after the filling process of the lubricant agent 92. Also, there may be a process added in which an oil repellent agent is applied to predetermined areas on the inner ring 21, the outer ring 22, and the shaft 20 near the open ends of the lubricant filling region. Such a process is considered desirable in that the process may help smoother filling of the lubricant agent 92 and prevent the leakage of the lubricant agent 92.

Next, a description will be given of a method for manufacturing a disk drive device 100 according to the present embodiment with reference to FIGS. 6 to 13.

Figure 6:
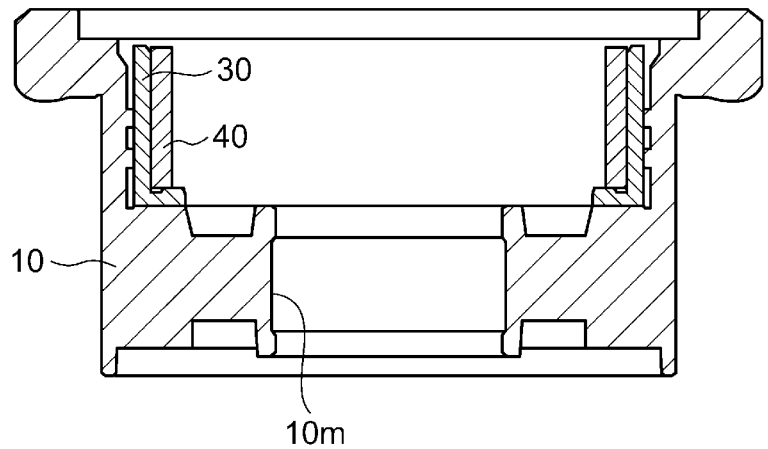
FIG. 6 is a diagram for explaining a method for manufacturing a disk drive device, which is an example of rotating apparatus, according to an embodiment of the present invention.
Figure 7:
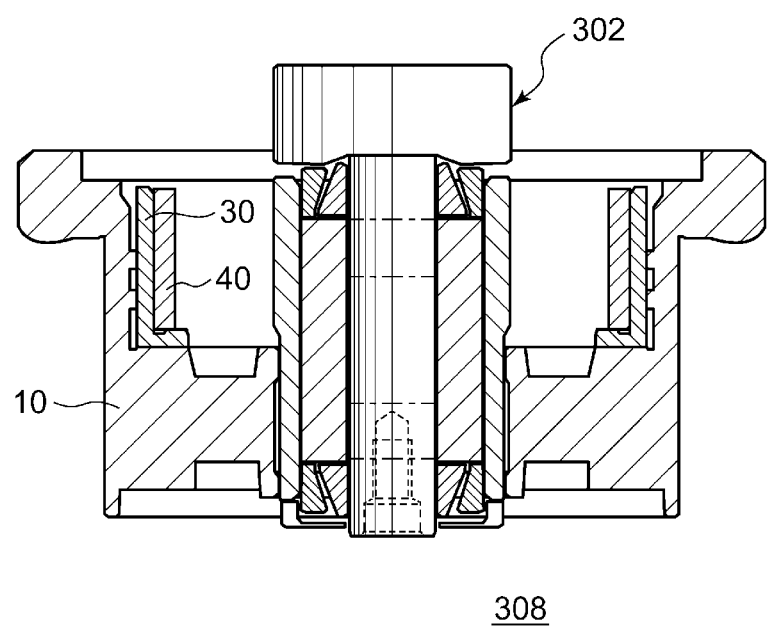
FIG. 7 is a diagram for explaining a method for manufacturing a disk drive device, which is an example of rotating apparatus, according to an embodiment of the present invention.
Figure 8:
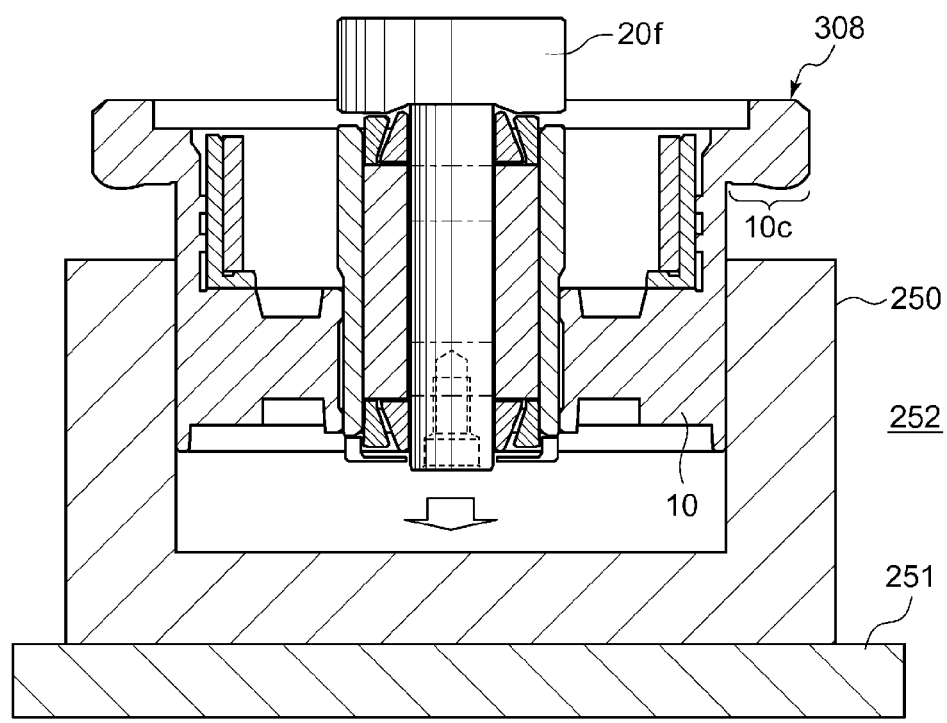
FIG. 8 is a diagram for explaining a method for manufacturing a disk drive device, which is an example of rotating apparatus, according to an embodiment of the present invention.

First, as shown in FIG. 6, the cylindrical magnet 40 is bonded to the hub 10 via the yoke 30. Then a predetermined amount of hardening resin 94 is applied to the recessed portion 10m of the hub 10. In doing so, the hardening resin 94 may be applied to the area closer to the base plate 50 from the axial center of the recessed portion 10m (the upper side of the recessed portion 10m in FIG. 6). This approach may be advantageous in that the hardening resin 94 spreads to the whole area of the recessed portion 10m as the bearing unit 302 is inserted there. In the bearing unit joining process, a subassembly 308 is assembled by joining the bearing unit 302 to the hub (see FIG. 7).

Next, in a setting process, an aligning block 252, made up of a base 251 and a cradle 250, which is movable in the horizontal direction on the base 251, is prepared. Now the subassembly 308 is placed on the aligning block 252 (see FIG. 8). For example, the subassembly 308 may be placed, with the larger diameter section 20f thereof up, on the aligning block 252. Also, the subassembly 308 may be placed on the aligning block 252, with the seating surface 10c, which is the disk seating area, touching the cradle 250. This approach is advantageous in that the inclination of the disk seating surface 10c can be reduced in relation to the base plate 50.

Figure 9:
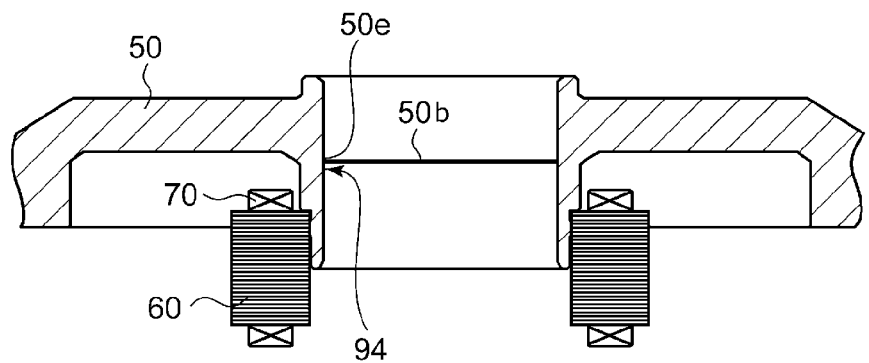
FIG. 9 is a diagram for explaining a method for manufacturing a disk drive device, which is an example of rotating apparatus, according to an embodiment of the present invention.

Next, in a resin application process, the hardening resin 94 is applied to the bearing hole 50e in the base plate 50, as shown in FIG. 9. In this process, the hardening resin 94 is applied circumferentially in an area axially closer to the entry side (lower side in FIG. 9) of the bearing hole 50e, of the part where the larger diameter section 20f is fit, for example, near the middle portion of the entire bearing hole 50e.

Figure 10:
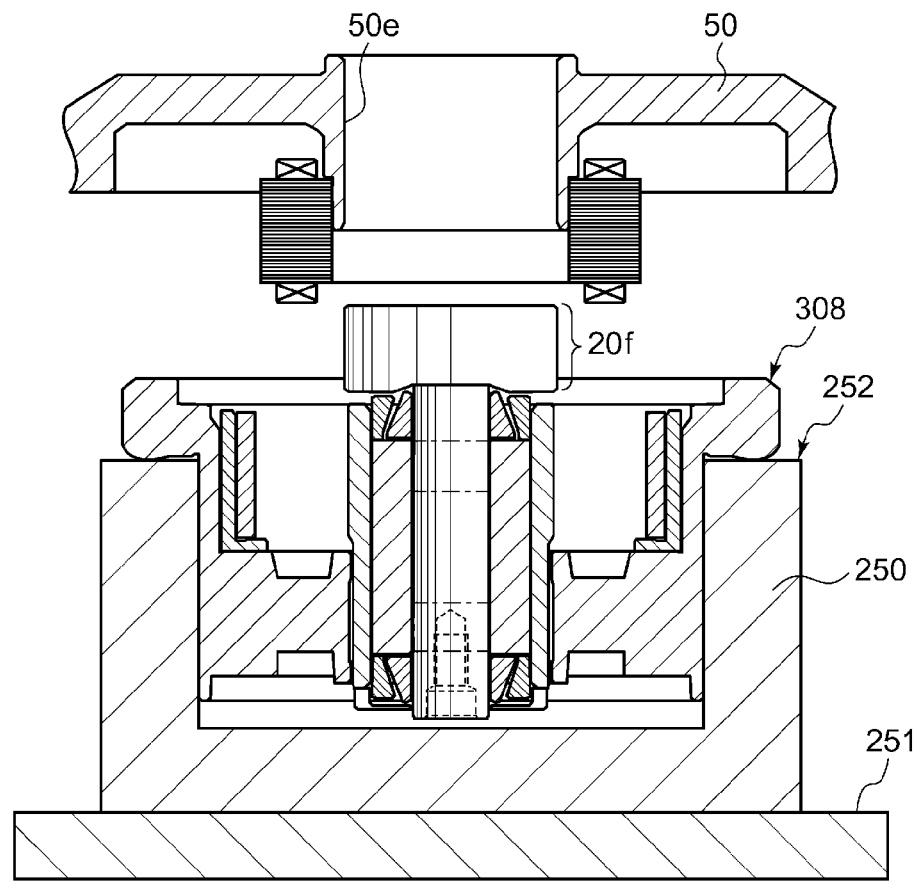
FIG. 10 is a diagram for explaining a method for manufacturing a disk drive device, which is an example of rotating apparatus, according to an embodiment of the present invention.
Figure 11:
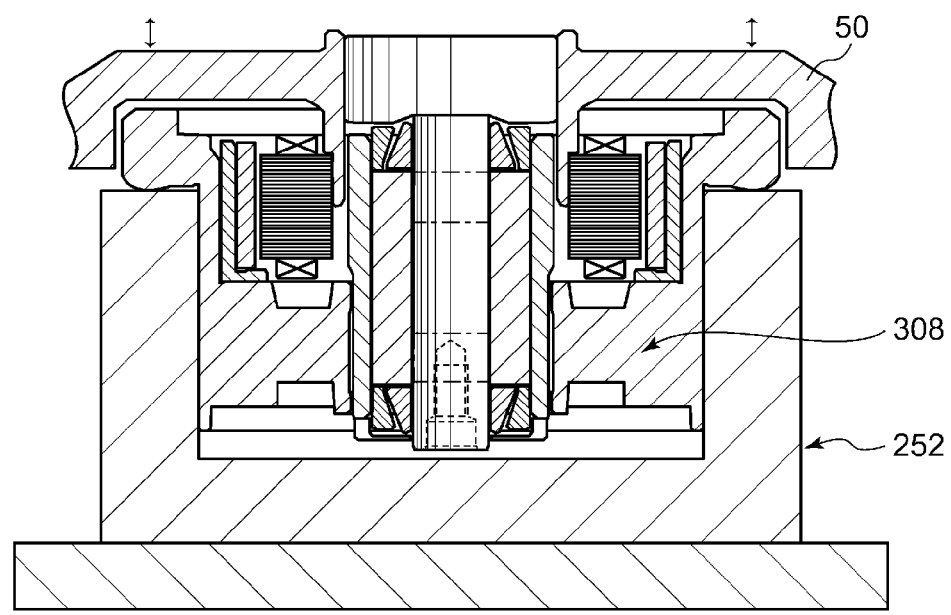
FIG. 11 is a diagram for explaining a method for manufacturing a disk drive device, which is an example of rotating apparatus, according to an embodiment of the present invention.
Figure 12:
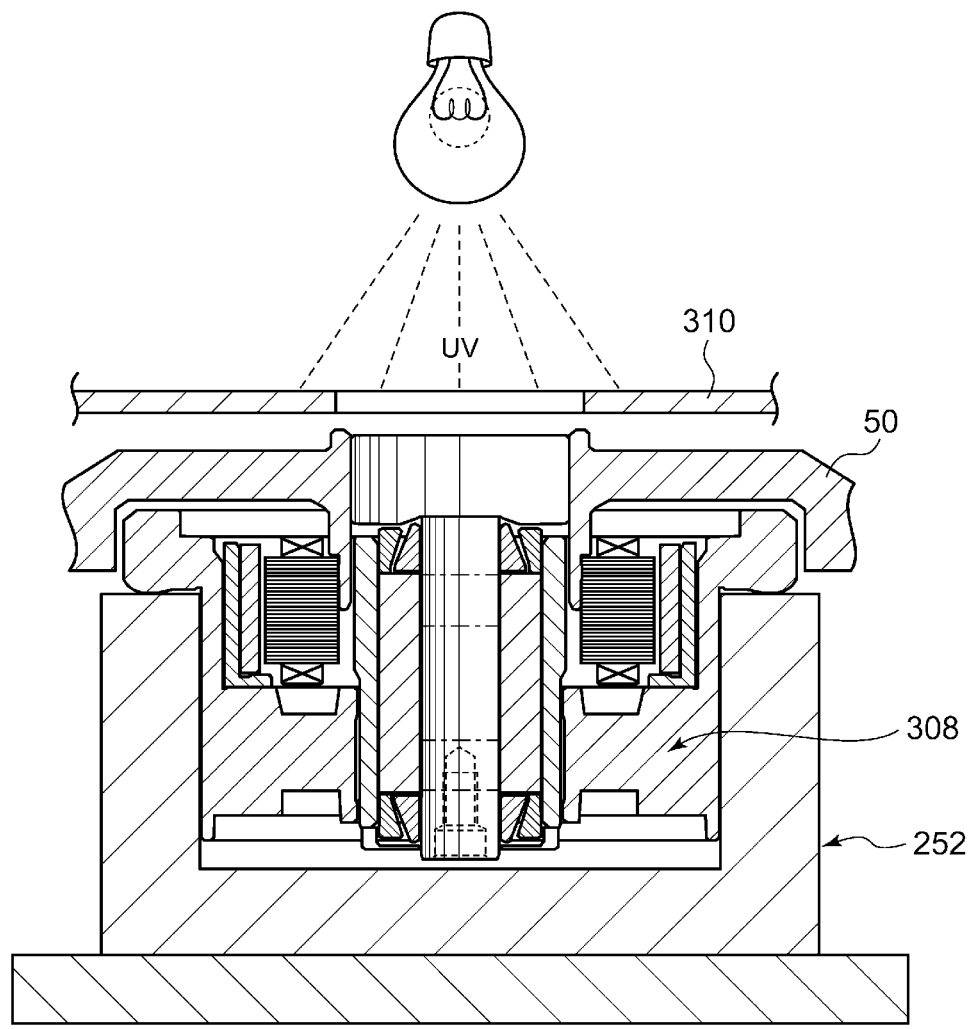
FIG. 12 is a diagram for explaining a method for manufacturing a disk drive device, which is an example of rotating apparatus, according to an embodiment of the present invention.
Figure 13:
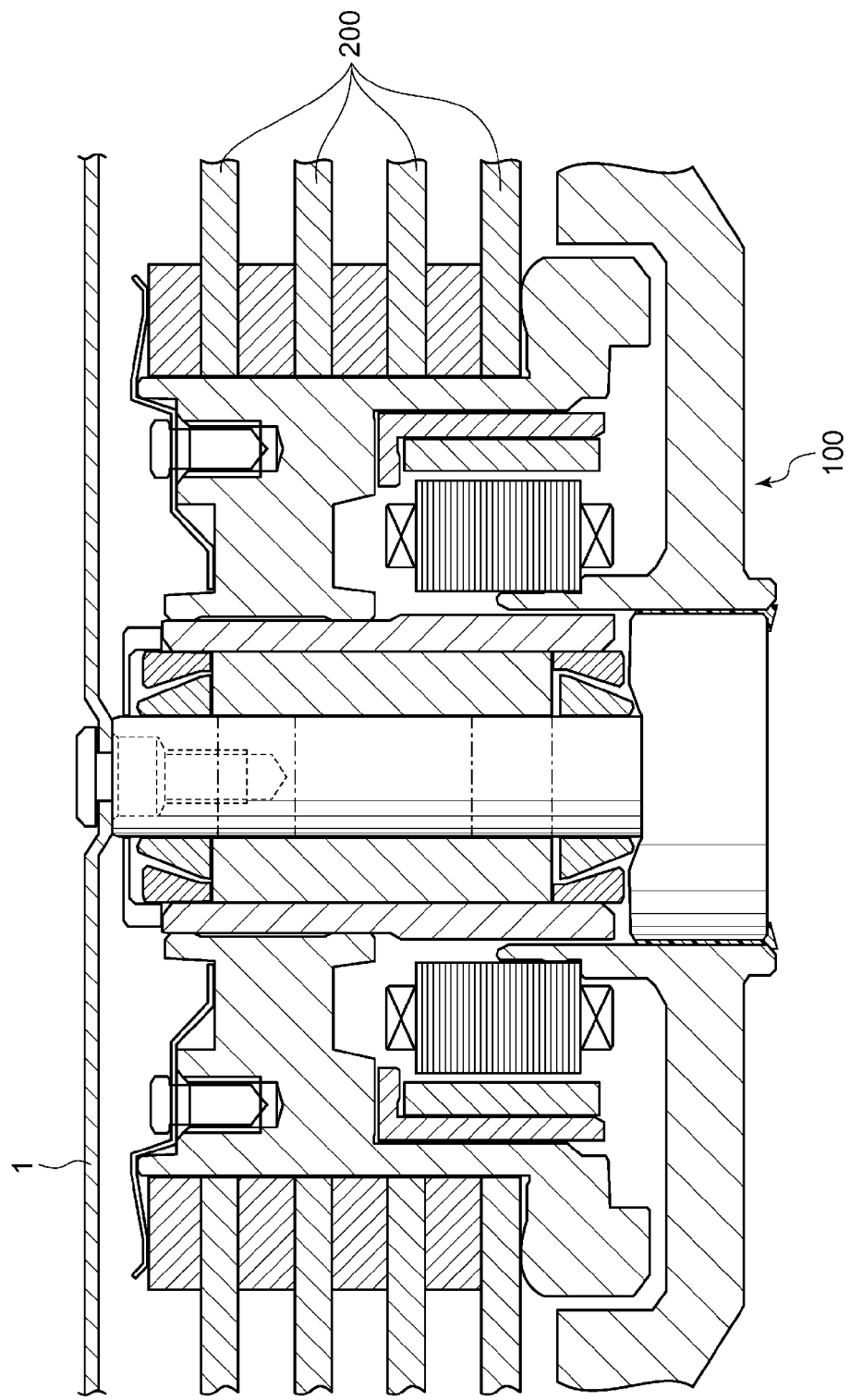
FIG. 13 is a diagram for explaining a method for manufacturing a disk drive device, which is an example of rotating apparatus, according to an embodiment of the present invention.

Next, in a fitting process as shown in FIG. 10, the base plate 50 is fit from up downward, with the bearing hole 50e thereof covering the larger diameter section 20f. The hardening resin 94 may be applied in a predetermined amount in a predetermined position such that some of it spills out along an outer edge of the bearing hole upon completion of the fitting process. This approach is preferable because it is easy to determine whether an adequate amount of the hardening resin 94 has been applied or not.

The uneven application of the hardening resin 94 in the circumferential direction or in the axial direction may result in uneven load due to the contraction of the hardening resin 94 when the hardening resin 94 hardens. In consequence, there may be cases of excessive inclination of the disk seating surface 10c in relation to the base plate 50. Therefore, a resin penetration process may be included in order to ensure an even distribution of the hardening resin 94 by having the hardening resin 94 penetrate the gap between the bearing hole 50e and the larger diameter section 20f before the hardening resin 94 hardens. For example, the arrangement may be such that after the base plate 50 is fit onto the larger diameter section 20f, the load from outside is removed for a predetermined period of time before the whole hardening resin 94 hardens (see FIG. 11). Also, the arrangement may be such that part of the hardening resin 94 hardens during the resin penetration process. This may allow the hardening resin 94 to spread evenly in the circumferential direction between the bearing hole 50e and the larger diameter section 20f, thereby suppressing the inclination of the base plate 50 in relation to the subassembly 308. The load removal time may be determined through experiments. It has been experimentally confirmed that the load removal time of 30 seconds or longer has an effect of reducing the inclination of the base plate 50 in relation to the subassembly 308. There may be no drop in productivity if the load removal time is set 120 seconds or less. For example, the load from outside can be removed with the base plate 50 and the subassembly 308 placed on the aligning block 252. This arrangement is preferable because the inclination of the seating surface 10c in relation to the base plate 50 is further suppressed.

Also, a correction process which corrects the inclination of the base plate 50 in relation to the subassembly 308 may be included before the hardening of the hardening resin 94, to make the inclination value of the disk seating surface 10c in relation to the base plate 50 smaller than a predetermined maximum value. For example, the inclination correction process may be carried out with the base plate 50 and the subassembly 308 placed on the aligning block 252 (see FIG. 11). This arrangement is preferable because the inclination of the seating surface 10c in relation to the base plate 50 is further suppressed.

Next, in a temporary hardening process, the hardening resin 94 that has spilt along the outer edge of the bearing hole 50e is irradiated with the ultraviolet light, for instance, thereby temporarily hardening the hardening resin 94. For example, the ultraviolet light may be irradiated from above the base plate 50 while the base plate 50 and the subassembly 308 is placed on the aligning block 252 (see FIG. 12). This arrangement, in which the hardening can proceed in stages, is preferable in that the inclination of the seating surface 10c in relation to the base plate 50 is suppressed. If the irradiation range of ultraviolet light becomes wider, the rise in temperature of the disk drive device 100 will be large. Thus, there is a strong possibility that the lubricant agent 92 will degrade and the constituent member(s) will be deformed. In the light of this, the temporary hardening process may be carried out in such a manner that the ultraviolet light is irradiated within a range slightly wider than the outer edge of the bearing hole 50e. For example, in the temporary hardening process, the ultraviolet light is irradiated such that a region outside the area which is slightly larger in diameter than the outer edge of the bearing hole 50e is covered with a cover 310. This mitigates the rise in temperature of a hardening part of the hardening resin 94 in the disk drive device 100, so that the aforementioned degradation of the lubricant agent 92, the deformation of the constituent member(s) and so forth can be suppressed.

Next, in a heating process, the hardening is promoted by heating the temporarily-hardened base plated 50 and subassembly 308. For example, the temporarily-hardened base plate 50 and the subassembly 308 may be left standing at 60° C. to 200° C. for 30 to 120 minutes. When the hardening resin 94 hardens almost completely, a predetermined joint strength can be ensured. In this case, too, the temporary hardening is first carried out and the effect due to the contraction of the hardening resin 94 is less likely to be present, so that the inclination of the seating surface 10c in relation to the base plate 50 can be suppressed.

Next, the disk drive device 100 which has been heated and hardened undergoes the inspection for predetermined performance. The thus inspected disk drive device 100 is packaged so that it can be kept away from outside air, and then it is transported to the next final assembly process. In the final assembly process of the disk drive device 100, the recording disks 200 are installed in the hub 10, and the data read/write unit 8 (see FIG. 1) and the top cover 1 (see FIG. 13) are fixed.

Figure 14:
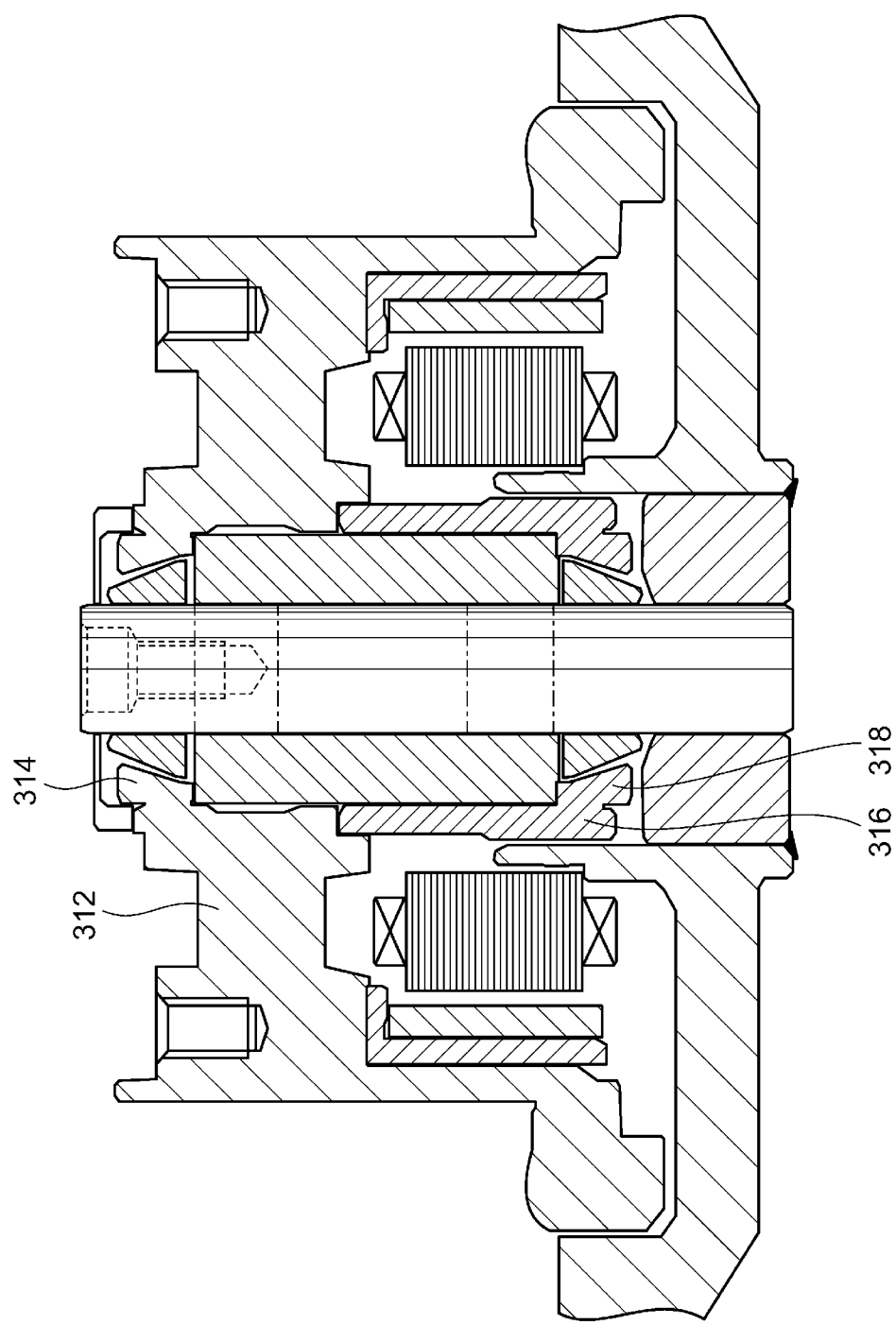
FIG. 14 is a diagram for explaining another exemplary structure of a disk drive device, which is an example of rotating apparatus, according to an embodiment of the present invention.

FIG. 14 is a cross-sectional view of the disk drive device 100 according to a modification. The outer ring 22 located in the upper side of FIG. 2 is formed as an integral outer ring 314, which is formed integrally with the hub 312, in FIG. 14. Also, the outer ring located in the lower side is formed as an integral outer ring 318 which is formed integrally with the outer sleeve 316. In this case, not only the reduced number of components is achieved but also the required number of steps in the assembly is reduced. Also, it is advantageous in that the leakage of the lubricant agent 92 from the gap between the outer ring and the outer sleeve is suppressed. Note here that the example of FIG. 14 shows a case where the larger diameter of the shaft 20 is structured by another member as the bush.

In the embodiments, "interference fit" is a method in which a member to be circularly surrounded whose diameter is larger than a circularly-surrounding member is fit to the hole of the circularly-surrounding member so as to be joined together. For example, the press fitting, a shrink fitting where the circularly-surrounding member is heated and the member to be circularly surrounded is fit thereto, or a cooling fitting where the member to be circularly surrounded is cooled and fit to the circularly-surrounding member may be used in the place of "interference fit".

In the embodiments, the hub 10 can be formed of various kinds of materials. The hub 10 may be formed such that, for example, aluminum alloy is used as material and the cutting work is employed. Since the size precision of the tilt preventing region can be set high, it is preferable in that the gap at the joint of the tilt preventing region and the outer sleeve 81 is made smaller so as to suppress the inclination of the hub 10.

In the embodiments, the inner sleeve 80 and the outer sleeve 81 can be formed of various kinds of materials. The inner sleeve 80 and the outer sleeve 81 may be formed of a stainless steel material having a longitudinal elastic modulus higher than that of the hub 10, for instance. Since the hub 10 having a low longitudinal elastic modulus is deformed when the hardening resin hardens and contracts, it is advantageous in that the deformation of the inner periphery of the inner sleeve 80 can be suppressed. The inner sleeve 80 and the outer sleeve 81 may be formed by the cutting work from JIS SUS 303, for instance. Since the size precision can be set high, such a process is preferable in that the gap between the hub 10 and the outer sleeve 81 is made smaller so as to suppress the inclination of the hub 10.

In the embodiments, the inner ring 21 and the outer ring 22 can be formed of various kinds of materials. The inner ring 21 and the outer ring 22 may be formed by the cutting work from a JIS SUS 303 material. This is preferable in that the size precision can be set high.

In the above-described embodiments, a description has been given of the disk drive device 100 where the thickness of each of the recording disks 200 installed in the hub 10 is 1.27 mm, but the present embodiments are not limited thereto. For example, the thickness of each of the recording disks may be 1.4 mm or above. This is preferable in that the resonance frequency of the recording disks varies and therefore the vibration of the recoding disks can be suppressed. Also, the thickness of each of the recording disks may be 1.7 mm or above, in which case the vibration of the recording disks can be further suppressed.

In the above-described embodiments, a description has been given of the disk drive device 100 where the number of magnetic poles of the cylindrical magnet 40 is eight and the number of salient poles is nine, but the present embodiments are not limited thereto. For example, the number of magnetic poles of the cylindrical magnet 40 may be an even number ranging from 8 to 16, and the number of salient poles may be multiples of 3 ranging from 9 to 18. As a result, the total turns of coils can be raised even though the downsizing is realized, and therefore the gap between magnet and the salient poles is made wider accordingly. This is preferable in that the increase in the cogging torque is suppressed and the vibration generated when the device is driven can be reduced.

In the above-described embodiments, a description has been given of the disk drive device 100 of an integrated type where the base plate 50 rotatably supports the hub 10, but the present embodiments are not limited thereto. For example, a brushless motor having a similar structure to that of FIG. 2 is produced separately, and the brushless motor is mounted on a chassis of the hard disk drive.

In the above-described embodiments, a description has been given of the disk drive device 100 of a so-called outer rotor type where the cylindrical magnet 40 is disposed outside the laminated core 60, but the present embodiments are not limited thereto. For example, the disk drive device may be of a so-called inner rotor type where the magnet is disposed inside the laminated core.

A description has been given of cases where the present embodiments are mainly applied to a hard disk drive but is not limited thereto. For example, the present embodiments may be applicable to an optical disk recording/reproducing device such as a CD (Compact Disc) device and a DVD (Digital Versatile Disc) device.

A description has been given of structures of disk drive devices according to the preferred embodiments. These embodiments are illustrative purposes only and merely indicate the principles and applications of the present invention. It is understood by those skilled in the art that various further modifications, changes in structure and so forth may be feasible as long as the technological ideas and thoughts underlying the present invention do not go beyond the scope of the appended claim and the embodiments added with such further modifications are also within the scope of the present invention.

What is claimed is:

1. A rotating apparatus comprising:
a base plate;
a hub having an opening in a center wherein a recording disk is to be placed on an outer circumference of the hub; and
a bearing unit configured to rotatably support the hub relative to the base plate,
the bearing unit including:
an outer sleeve joined to an inner circumference of the opening;
an inner sleeve joined to an inner circumference of the outer sleeve;
a shaft housed in the inner sleeve wherein one end of the shaft is jointed to the base plate;
a radial dynamic pressure groove provided on at least one of an inner circumferential surface of the inner sleeve and an outer circumferential surface of the shaft; and
a lubricant agent present in between the inner circumferential surface of the inner sleeve and the outer circumferential surface of the shaft,
wherein in a joined portion of the outer sleeve and the hub, there are formed a binding region where the outer sleeve and the hub are joined together with a hardening resin present therebetween and a raised region, provided on both sides of the binding region in an axial direction of the outer sleeve, which forms a portion narrower than a gap, between the outer sleeve and the hub, corresponding to the binding region.

2. The rotating apparatus according to claim 1, wherein an inner ring having a first tapered portion and an outer ring having a second tapered portion are placed axially at both ends of the inner sleeve,
  wherein an inner periphery of the inner ring is joined to an outer circumferential surface of the shaft, and an outer periphery of the inner ring is such that the first tapered portion contracts in diameter axially away from an end of the inner sleeve, and
  wherein an outer periphery of the outer ring is joined to a hub side, and an inner periphery of the outer ring is such that the second tapered portion contracts in diameter axially away from an end of the inner sleeve in opposition to the first tapered portion,
  wherein a gap formed between the opposing first tapered portion and the second tapered portion constitutes a capillary seal which is wider axially away from the end of inner sleeve.

3. The rotating apparatus according to claim 2, wherein at least one of the outer rings placed axially at both ends of the inner sleeve is formed integrally with a hub side member in such a manner as to rotate in one with the hub.

4. The rotating apparatus according to claim 2, wherein at least one of the outer rings placed axially at both ends of the inner sleeve is formed integrally with the outer sleeve.

5. The rotating apparatus according to claim 2, wherein the inner ring is disposed such that an axial end face of the inner ring faces an axial end face of the inner sleeve with a predetermined gap therebetween, wherein the outer ring is disposed such that an axial end face of the outer ring is in contact with the axial end face of the inner sleeve, and
  wherein the axial end face of the inner sleeve is such that a region facing the axial end face of the inner ring and a region in contact with the axial end face of the outer ring are flat.

6. The rotating apparatus according to claim 2, wherein a thrust dynamic pressure groove is formed on at least one of an axial end face of the inner ring and an axial end face of the inner sleeve opposite thereto, and a lubricant agent is present between the thrust dynamic pressure groove and a surface opposite thereto.

7. The rotating apparatus according to claim 6, wherein the thrust dynamic pressure groove is formed on the axial end face of the inner sleeve such that the thrust dynamic pressure groove lies across a region facing the axial end face of the inner ring and a region in contact with an axial end face of the outer ring.

8. The rotating apparatus according to claim 2, wherein the inner ring is disposed such that an end of the inner ring on a diameter contracting side is projected axially relative to the inner ring from an end of the outer ring on a diameter contracting side.

9. The rotating apparatus according to claim 2, wherein a communicating path that communicates axial end faces of the outer ring placed axially at the both ends of the inner sleeve is formed in at least one of the outer sleeve and the inner sleeve, and
  the lubricant agent is present in the communicating path.

10. The rotating apparatus according to claim 9, wherein the communicating path is formed such that a groove is formed on a surface of either one of the outer sleeve and the inner sleeve and such that the groove is held between the inner sleeve and the outer sleeve.

11. The rotating apparatus according to claim 2, further comprising a cap member joined to an outer circumferential surface of the outer ring in such a manner as to cover an air-liquid interface of the capillary seal.

12. The rotating apparatus according to claim 2, wherein the inner sleeve is such that a lubricant reservoir is formed, in the inner circumferential surface of the inner sleeve, axially inside the radial dynamic pressure groove, and
  wherein one of the raised regions surrounds circularly the outer ring and at least part thereof is placed in a position axially overlapping the outer ring, and
  the other of the raised regions surrounds circularly the lubricant reservoir and at least part thereof is placed in a position axially overlapping the lubricant reservoir.

13. The rotating apparatus according to claim 1, wherein the hub has a dividing wall which extends in an axial direction toward the base plate so as to form an outer cylinder part outward, and in the hub there are formed an outer circumferential recessed portion which is recessed in the axial direction from the dividing wall on a radially inner side of the dividing wall, an inner circumferential recessed portion which is recessed in the axial direction from the outer circumferential recessed portion on the radially inner side of the outer circumferential recessed portion, and a circumferential raised portion which projects in an axially downward direction from the inner circumferential recessed portion on the radially inner side of the inner circumferential recessed portion,
  wherein an inner circumferential side of the circumferential raised portion is connected to the raised region.

14. The rotating apparatus according to claim 1, wherein the hub is formed of a material having a longitudinal elastic modulus lower than that of the inner sleeve.

15. The rotating apparatus according to claim 1, the hub including:
  an outer cylinder part, an outer circumference of the outer cylinder part being engaged with an inner circumference of the recording disk;
  a disk placement section projecting radially outward toward an end of the outer cylinder part on a base plate side in the axial direction of the outer cylinder part;
  a second circumferential recessed portion which is recessed in the axial direction on a radially inner side of the outer cylinder part; and
  a first circumferential raised portion projecting in the axial direction on the radially inner side of the second circumferential recessed portion.

16. The rotating apparatus according to claim 15, wherein the hub is such that an axial length of the raised region corresponding to the first circumferential raised portion is less than or equal to the axial length of the first circumferential raised portion.

17. A method for manufacturing the rotating apparatus, according to claim 1, the method comprising:
  assembling the bearing unit including the shaft, the shaft having a smaller diameter section housed in the inner sleeve and a larger diameter section which is larger in diameter than the smaller diameter section;
  assembling a subassembly by jointing the hub to the bearing unit;
  placing the subassembly in such a manner that a disk placement section included in the subassembly touches a cradle provided on a base of an aligning block;
  applying a hardening resin to a bearing hole of the base plate, the base plate having the bearing hole in which the larger diameter section is housed in a loosely fit state;
  moving the base plate in such a manner that a center of the bearing hole coincides with a center of the larger diameter section, and fitting the bearing hole to the larger diameter section such that a part of the hardening resin spills out along an outer edge of the bearing hole;

having the hardening resin evenly penetrate a gap between the bearing hole and the larger diameter section before the hardening resin hardens;

temporarily hardening the part of the hardening resin spilt out along the outer edge of the bearing hole with the base plate and the subassembly placed on the aligning block; and hardening the base plate and the subassembly after the hardening resin has temporarily hardens.

18. The method, for manufacturing the rotating apparatus, according to claim 17, wherein the aligning block is structured such that the cradle is movable horizontally relative to the base, and wherein the subassembly is placed, with the larger diameter section up, on the aligning block.

19. The method, for manufacturing the rotating apparatus, according to claim 17, wherein after the base plate is fit onto the larger diameter section, a load from outside is removed for a predetermined period of time before the whole hardening resin hardens.

20. The method, for manufacturing a rotating apparatus, according to claim 17, further comprising correcting inclination of the base plate relative to the subassembly such that an inclination value of the disk placement section relative to the base plate is less than a predetermined maximum value before the hardening resin hardens.

* * * * *